United States Patent [19]

Juelich et al.

[11] Patent Number: 4,568,232
[45] Date of Patent: Feb. 4, 1986

[54] BARGE MOUNTED HORIZONTAL BOOM BULK UNLOADER

[75] Inventors: Richard J. Juelich, Stillwater, Minn.; Louis F. Ray, Baton Rouge, La.

[73] Assignee: American Hoist & Derrick Company, St. Paul, Minn.

[21] Appl. No.: 449,328

[22] Filed: Dec. 13, 1982

[51] Int. Cl.⁴ .............................................. B65G 67/58
[52] U.S. Cl. .................................... 414/138; 198/568; 198/594; 212/190; 414/137; 414/139; 414/143; 414/144
[58] Field of Search ............... 414/137, 138, 139, 140, 414/141, 143, 144, 394; 114/258, 73; 198/594, 568; 212/190

[56] References Cited

U.S. PATENT DOCUMENTS

| | | | |
|---|---|---|---|
| 1,190,822 | 7/1916 | Vandevelde | 414/139 |
| 3,183,916 | 5/1965 | Marino | 414/139 X |
| 3,198,353 | 8/1965 | McDowell | 414/139 |
| 3,269,562 | 8/1966 | Holmes et al. | 414/139 |
| 3,307,717 | 3/1967 | Ludwig | 414/139 |
| 3,337,025 | 8/1967 | Dykeman . | |
| 3,356,232 | 12/1967 | Price et al. . | |
| 3,420,388 | 1/1969 | Briggs . | |
| 3,486,641 | 12/1969 | Zweifel et al. | 414/139 |
| 3,704,796 | 12/1972 | Dedons et al. | 414/139 |
| 3,861,539 | 1/1975 | Becker, Jr. | 414/139 |
| 3,938,676 | 2/1976 | Croese | 414/139 X |

FOREIGN PATENT DOCUMENTS 267841 9/1929 Italy ..................................... 212/190

*Primary Examiner*—Frank E. Werner
*Attorney, Agent, or Firm*—Kinney & Lange

[57] ABSTRACT

A bulk material unloader includes parallel, spaced-apart main and back barges or pontoons which are held in fixed relationship with respect to each other by four collar frames. Two parallel cargo lighters are positioned between pontoons and the unloader is moored alongside ship. The two midship collar frames support a two-legged main tower over the main barge and a two-legged back tower over the back barge. A horizontal boom assembly includes a back bridge extending between the towers and an outboard boom supported by the towers and normally extending away from the back bridge and over the ship in parallel, end-to-end alignment with the back bridge. A horizontal bulk material conveyor assembly on the horizontal boom assembly includes two fixed parallel top horizontal endless belt-type conveyors supported on the back bridge and two parallel bottom horizontal endless belt-type conveyors supported on the boom assembly to move back and forth under the top conveyors and situated to receive bulk materials leaving the top conveyors. A chute is mounted at the outboard ends of the bottom conveyors, and bulk material deposited on the bottom conveyors is discharged into the chute for delivery to a hold of the ship. A bucket trolley and a grab bucket run on tracks which extend the entire length of the boom assembly. A hopper is situated on the back barge under the tracks so the bucket can deposit materials from the lighters into the hopper. An elevating conveyor carries materials from the hopper to the top horizontal conveyors. The chute is removable for offloading so the bucket trolley can move out to the outboard end of the outboard boom.

14 Claims, 11 Drawing Figures

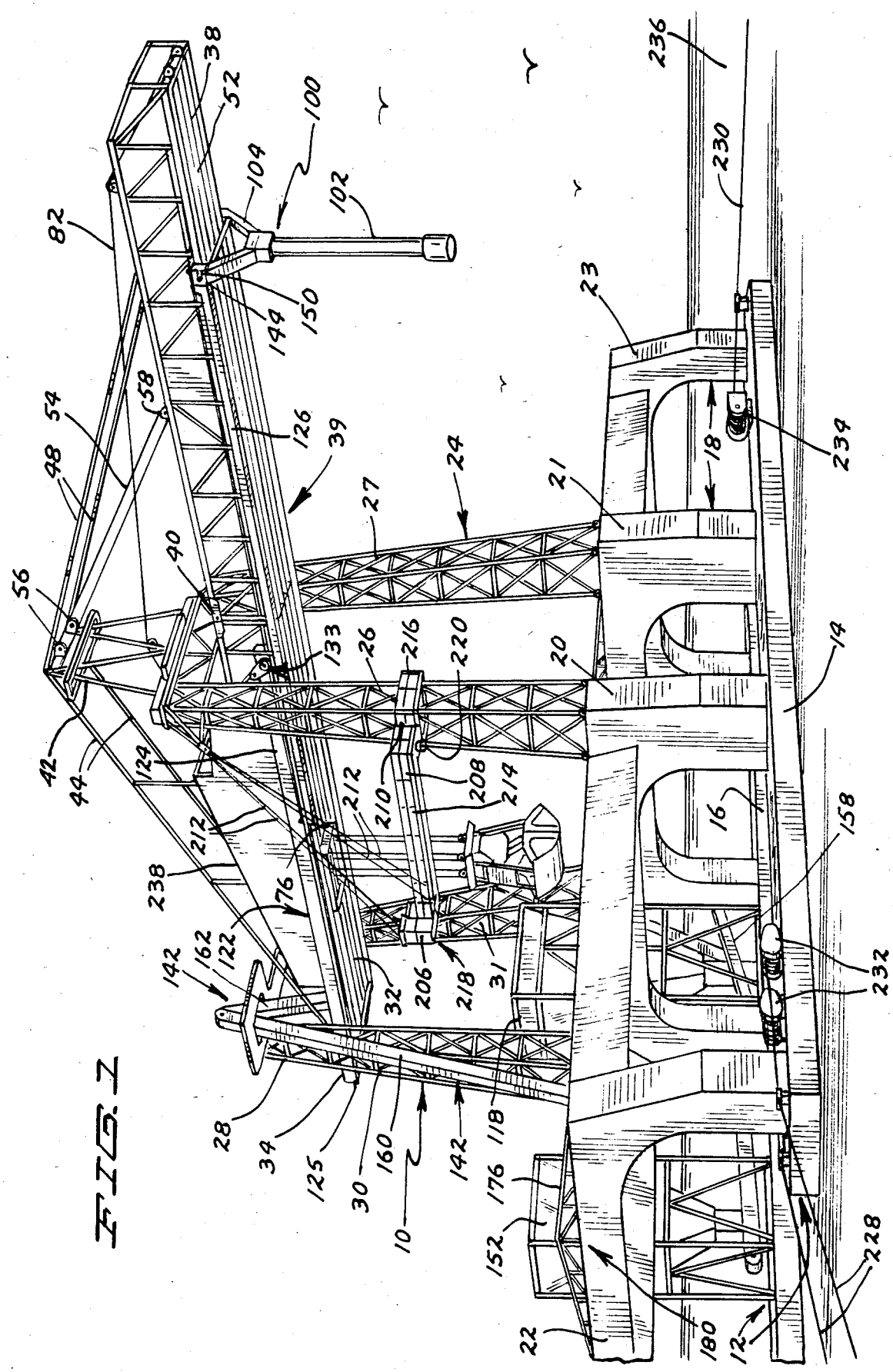

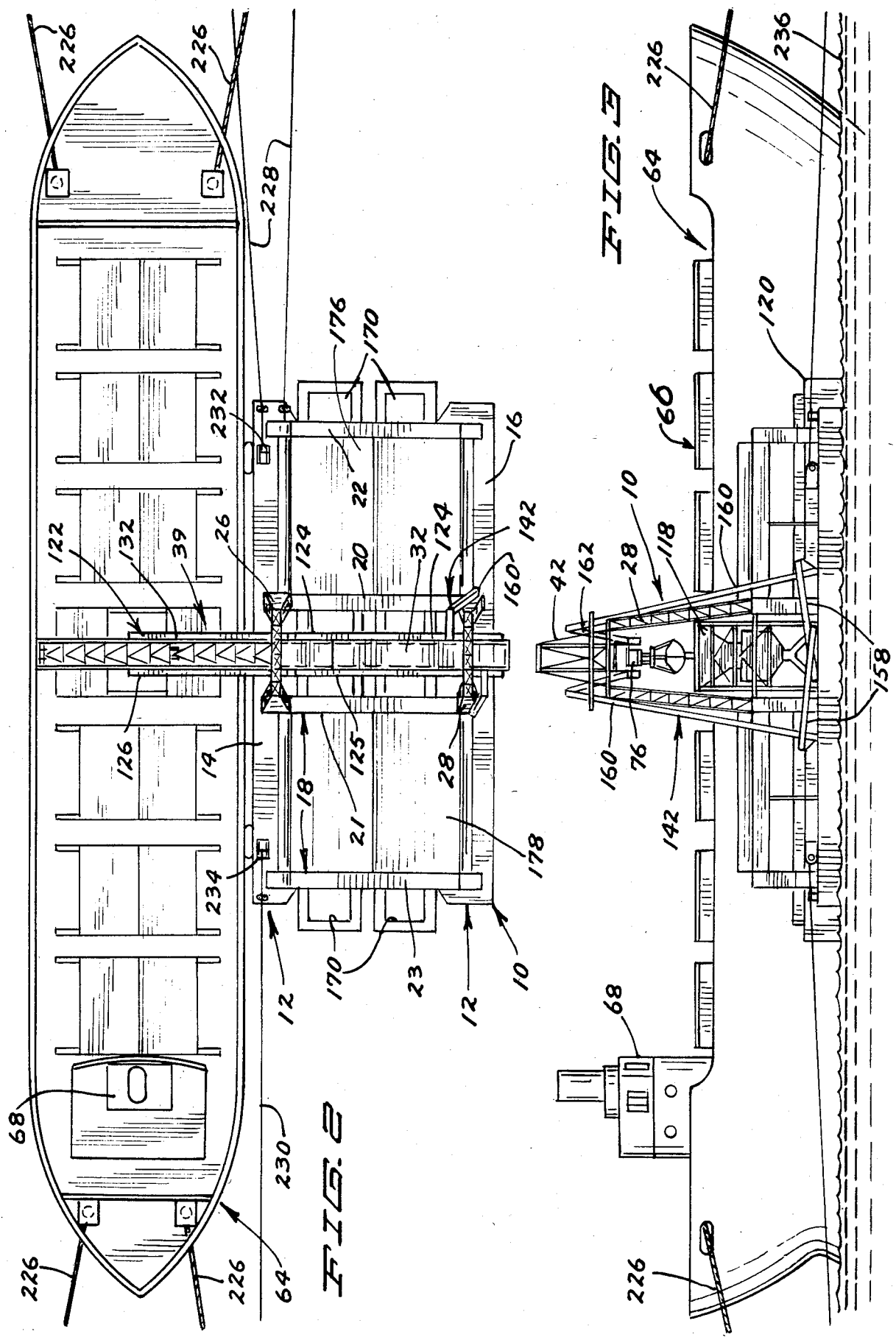

BARGE MOUNTED HORIZONTAL BOOM BULK UNLOADER

BACKGROUND OF THE INVENTION

1. Field of the Invention

This invention has relation to floating structures capable of unloading bulk materials from ship to cargo barges or lighters, for loading bulk materials from lighters to ships, for loading such materials from lighters to shore, from shore to lighters, and to and from shore and ships.

2. Description of the Prior Art

It is advantageous to be able to rapidly load ships with bulk materials such as grain and grain byproducts at locations where dock facilities for receiving deep draft vessels are not available. This has been accomplished in the past by loading the bulk material onto cargo barges or lighters, anchoring the ship against substantial movement in waters of safe depth, and then providing some kind of an unloader to transfer the bulk material from the lighters to the hold of the ship. Often the ship will be anchored "midstream" at the point where a river runs into a gulf, bay, or larger body of water.

The time during which the ship is necessarily at anchor represents a very substantial economic investment or drain on the shipper. It is highly advantageous to do everything possible to reduce the time for loading or unloading the ship and thus reducing what is called the "turn-around time".

In order to accomplish this purpose in the past, a tower mounted on a single barge has been equipped with a horizontal boom extending transversely outwardly from the tower and the barge to have position over lighters at one side and over a ship at the other. A clam shell-type grab bucket running on a bucket trolley along this boom has been used to transport the bulk material from the lighter to the ship for onloading and from the ship to the lighter for offloading. An early patent showing such a structure is U.S. Pat. No. 734,974 to Shoosmith, patented in July of 1903. In order to try to keep the boom from rocking with the rocking of the barge as the bucket trolley, bucket and material move along the boom, Shoosmith moved a large counterweight transversely along the bottom of the barge in opposition to the direction of movement of the grab bucket along the boom.

More recently, others have attempted to obtain stability for such a structure by moving a counterweight along the boom in direction opposite to the movement of the bucket and bucket trolley and the bulk material in the bucket trolley. See, for example, the following patents:

| U.S. Pat. No. | Inventor | Issued |
|---|---|---|
| 4,220,246 | Ray | 9/1980 |
| 1,343,630 | Locarni | 6/1920 |

This method of moving a counterweight in opposition to movement of a bucket, bucket trolley and load carried in the bucket has also been used extensively where the tower is mounted on land. Such structures are useful where docking facilities are such that a ship can come right up against the side of the pier. See the following patents.

| U.S. Pat. No. | Inventor | Issued |
|---|---|---|
| 4,067,446 | Ray | 1/1978 |
| 3,642,148 | Durand | 2/1972 |
| 3,722,705 | Gould | 3/1973 |
| 4,113,112 | Ray | 9/1978 |
| 654,739 | Lancaster | 7/1900 |
| 4,039,086 | Ray | 8/1977 |

It has been suggested to stabilize a vertical tower and horizontal boom structure mounted on a single barge or pontoon by providing fixed weights at one or both ends of the boom. See the following patents:

| U.S. Pat. No. | Inventor | Issued |
|---|---|---|
| 4,074,817 | Ray | 2/1978 |
| 4,074,818 | Ray | 2/1978 |

This same technique has been suggested for use with a vertical tower and horizontal boom mounted on the ground. See U.S. Pat. No. 3,752,326, granted to Levingston in August of 1973.

The difficulty with these "single barge" or "single fixed tower" structures is that the counterweight effect can only be approximate. For example, when the grab bucket initially fills and closes and picks up the weight of the bulk material, the boom suffers a severe imbalance, first when the weight of the bucket is removed from the boom when the bucket is dropped, jaws opened, into the ship hold or lighter preparatory to picking up its bulk material load, and second, when the bucket jaws are closed and the entire weight of the bucket and the bulk materials inside are suddenly applied to the boom. This inevitably results in some deflection of the boom, and some vertical swinging of the boom until the forces are absorbed. This will cause the bucket to swing in a vertical plane. To minimize this effect, the digging and dumping operations must be slowed down substantially to avoid the possibility of severe damage caused by and to the swinging bucket.

Also, in the case of single barge or pontoon structure, this instability is added to by the effect of any swell and/or wave action.

Further, the use of counterweights and counterbalances means that the overall structure must be designed to carry this extra, otherwise nonproductive, counterbalancing weight. In the structures where the counterbalance actually moves at the same time as the bucket trolley, bucket and bulk material load in the bucket, the acceleration and deceleration of the counterweight are unwelcome energy losses.

It has been found that very substantial increases in the stability of a bulk material unloader cam be obtained by utilizing two spaced-apart parallel pontoons fixedly positioned one with respect to the other by overhead bolsters. See the following U.S. patents:

| U.S. Pat. No. | Inventor | Issued |
|---|---|---|
| 3,938,676 | Croese | 2/1976 |
| 3,673,974 | Harper | 7/1972 |
| 3,894,503 | McClure | 7/1975 |
| 4,106,637 | Marsden | 8/1978 |

The Croese patent discloses an onloader having two pontoons spread wide enough apart so that a single cargo barge or lighter can be positioned therebetween.

To attempt to gain further stability against rocking, the bulk material is removed from the lighter through the instrumentality of an endless bucket conveyor elevator 13, and further endless conveyor legs which are counterbalanced to deliver the grain to the hold of a ship. Apparently no provision is made for offloading from the ship to the lighter. Further, the disclosure contemplates that all or a substantial portion of the hatch covers on the lighter must be removed from the lighter before the endless bucket conveyor can start removing bulk materials therefrom. Also, when a particular lighter has been emptied, the flow of bulk material from the floating unloading installation to the ship must stop until the hatch covers are placed back on top of the lighter, and the lighter is hauled away and another loaded lighter takes its place, and until sufficient hatch covers are removed from the loaded lighter to let the conveying mechanism again start to operate.

The problem of maintaining stability between the lighters and the bulk material unloader and between the unloader and a ship are clearly illustrated in the solution to the problem disclosed in the patent to Marsden. As seen in that patent, the bulk material unloader or floating transfer vessel is moored to the side of a ship, and the bulk material is literally blown or aimed in a stream into the ship through downspouts located high above it. In this way, the importance of movement between the ship and the unloader is minimized. However, this is at the expense of creating large amounts of dust in unloading materials such, for example, as grain and grain by-products.

In Marsden, the transfer vessel or bulk unloader is of such a nature that its hull can be partially filled with water, a lighter pulled into the interior of the transfer vessel, and then the water pumped out to "strand" the lighter on the floor of the bulk unloader or vessel. Thus there will be no relative movement whatever between the lighter and the unloader, and a plurality of endless bucket diggers can be used to move along the floor of the lighter with precision to scoop up grain and move it to an elevating means where it can be fed into the ship through downspouts as aforementioned.

This operation is obviously not a continuous one inasmuch as water must be allowed into the unloader or transfer vessel to partially submerge it, one lighter must be towed inside of the unloader, the hatch covers all removed, water pumped back out of the vessel to have the vessel pick up the weight of and firmly support the lighter, all before the grain or other bulk material removal process can be begun. When removal has been completed, the hatch covers must be replaced, and water let back into the unloader vessel to allow the lighter to float free so that it can be replaced with yet another lighter, and then the entire cycle completed. Obviously the "down time" is extensive.

The patents to Harper and McClure make use of twin pontoons for supporting revolving cranes. However, these twin pontoons are not designed so that cargo lighters can be brought between them. Instead, the structures of the patents are designed to support the revolving cranes for other purposes such, for example, as servicing offshore oil rigs. Further, each of the twin pontoon structures are designed to be semi-submersible in order to try to avoid the action of heavy seas and the effect of such action on the stability of the structures.

As suggested above, an ability to move cargo lighter hatch covers off of the hatches of the lighters and to replace them without interrupting the action of a bulk material unloader in constantly moving bulk materials to ships from lighters or to lighters from ships is very important. Typically, before the present invention, in fair weather, each lighter was moved to position adjacent an auxiliary platform such, for example, as that shown in the Harper and McClure patents, and a revolving crane was used to lift the hatch covers off of the lighter hatches one at a time and to stack them on such platform. Then after the lighter was fully loaded or unloaded by a prior art unloader, depending on whether it was in an offloading or an onloading situation, the lighter would again be towed to the auxiliary vessel where the covers are positioned back on the hatches, one after the other.

This would be fairly efficient timewise if there were always enough uncovered lighters available to the bulk unloader or other apparatus so that the lighter could be exchanged without waiting for the lighter hatch covers to be removed. However, when handling bulk materials which are moisture sensitive, when the rains began, all of the lighters which were uncovered, including the lighter currently being loaded or unloaded, had to be towed to the vicinity of the revolving crane, all of the covers put back on, and the operation of loading or unloading shut down until the weather cleared.

Efforts have been made to overcome this problem. See the following patents:

| U.S. Pat. No. | Inventor | Issued |
|---|---|---|
| 3,938,676 | Croese | 2/1976 |
| 4,106,637 | Marsden | 8/1978 |
| 3,283,923 | Schynder | 11/1966 |
| 4,238,036 | Lamer et al | 12/1980 |
| 3,774,787 | Ledinsky | 11/1973 |

As previously pointed out, in the disclosure of the Croese patent, many if not all of the lighter hatch covers must be removed before the unloading can begin. In case of rain, the Croese lighter will be virtually unprotected except perhaps for a small portion of the end opposite the digging apparatus, so digging will have to stop and the covers will have to be returned.

The patent to Marsden shows a lighter hatch cover 20 which, it is said, is supported above the lighter by "overhead block and tackle 22 and are held aloft and out of the way." Because the automated digging and conveying apparatus moves the entire length of the lighter, it is necessary that beginning of this digging operation be delayed until all of the hatch covers are off and up out of the way. Once the automated digging and cleanup have occurred, it will be necessary that all of the hatch covers be replaced before the lighter can be removed from the transfer vessel or bulk unloader and replaced with another loaded and covered lighter. There is no provision in the teaching of Marsden for offloading of the ship and consequent loading of the lighters situated in the transfer vessel or bulk unloader.

The Lamer et al patent presents a heavy, elaborate and expensive apparatus for replacing hatch covers on ship's cargo hold openings. The hatch cover crane of Lamer lifts the hatches, tilts them up on one end and moves them so that the other end is in alignment with the hatch and then lowers the hatch cover into place. It is not believed to be particularly pertinent to the present invention, but does illustrate the difficulty and importance of properly handling hatch covers.

The patent to Schnyder shows a traveling crane mounted on tracks along a building and extending above the roof top of the building. The crane travels along over the top of the building to remove roof sections and stack them one on top of the other at one of the ends of the building. Obviously the structure of Schnyder does not have to be concerned with alignment of the roof sections inasmuch as the rails which carry the crane are permanently fastened with respect to the roof. Thus Schnyder is not helpful in facing the problem of rapid realignment of lighter hatch covers on hatches, which was the problem solved, for example, by the aforementioned patent to Lamer et al.

Because no problem of alignment is involved, it is believed that the patent to Ledinsky is not particularly pertinent to the present invention.

Before the present invention, where it was deemed essential that the machine operator be able to see precisely the location of a bucket mounted from a bucket trolley on a horizontal boom, for example, the operator's control cab was often either made a part of the bucket trolley structure or was fitted to ride along the boom with the bucket trolley. The alternative was to permanently affix the operator's cab to the central tower, and to transmit visual, audible and/or electronic signals to the operator when the bucket, for example, reached a location where he could no longer properly observe it. See the following patents:

| U.S. Pat. No. | Inventor | Issued |
|---|---|---|
| 3,402,824 | Zweifel | 9/1968 |
| 3,722,705 | Gould | 3/1973 |
| 4,067,446 | Ray | 1/1978 |
| 4,074,817 | Ray | 2/1978 |
| 4,074,818 | Ray | 2/1978 |

Experience has shown that a man riding in a control cab mounted on a trolley or to ride with a trolley is subject to intense vibrations, often causing back problems and absenteeism resulting in severe physical difficulties for the operator and lost time and Workman's Compensating claims made against the owner.

Having the cab situated at a fixed location where the operator cannot see properly and/or is instructed by signals received from persons who can view the operation results either in a slowdown of operations to decrease the chance of accidents or in an increase of accidents due to poor visibility for the operator and lack of coordination with the signaller(s).

What was needed before the present invention was a bulk material unloader which can operate in "midstream" in adjacent relation to a ship and can operate continuously and without interruption from the time operations begin to fill or empty a particular hold of a ship until such time as that operation is completed, and without any interruption of the normal operation due to the movement and handling of the cargo lighters involved.

Also needed was a bulk material unloader which can be easily converted from onloading operation from lighters to unloader to ship to offloading operation from ship to unloader to lighters.

A search was made of an earlier form of the invention set out herein. Applicants and those in privity with them are aware of no prior art which is closer than that discussed above and are aware of no prior art which anticipates the claims made herein.

SUMMARY OF THE INVENTION

A barge mounted, horizontal boom, bulk material unloader includes parallel, spaced-apart, elongate barges or pontoons fixedly positioned with respect to each other by barge connecting means mounted on and extending between the barges or pontoons in spaced relation to the surface of the body of water or other liquid in which they are floated. An upstanding main tower is carried in a midship's location by one of the barges known as the main barge and an upstanding back tower, also located amidships is carried by the other barge, known as the back barge. A horizontal boom means is supported on the towers and includes a back bridge extending between the towers and an outboard boom supported by the towers and normally extending away from the back bridge in parallel end-to-end, longitudinal alignment with the back bridge.

A horizontal bulk material conveyor means is supported in aligned parallel relation to the horizontal boom means in position to deliver bulk materials disposited thereon to a horizontal conveyor discharge point along the outboard boom, and chute means supported on the outboard boom is associated with the horizontal material conveyor in position to receive the bulk materials discharged from that conveyor at the horizontal conveyor discharge point, and to discharge those materials to a location for storage or processing outboard of the main tower in, for example, the hold of a ship.

Track means is also supported by the towers on the boom means and extends in aligned parallel relation to the back bridge and to the outboard boom from a back portion of the back bridge to an outer end portion of the outboard boom. A bucket trolley is movably supported on a track means and means is provided for moving the trolley along the track means. A bucket is operably supported from the trolley and is vertically movable with respect to the trolley between a digging position where the bucket is opened and lowered into the bulk materials to be unloaded, elevated positions where the bucket is in clearing relation to obstacles and can be moved along with the trolley means under the track, and discharge positions along the boom means where the bucket can be tripped to discharge the bulk materials therein.

A main hopper is supported on the barges, on the back barge in the form of the invention as shown. It is aligned under the back bridge and track means so that it is in a position to receive materials discharged from the bucket when the bucket is vertically aligned over it. Elevating conveyor means are provided to carry materials from the hopper up to be deposited on the horizontal bulk material conveying means.

In the form of the invention as shown, when the unloader is used in its onloading configuration, the chute means will receive bulk materials from the hopper, elevating conveyor means and horizontal conveyor means and will deposit those materials to a location for use such as a ship.

To utilize the unloader in its offloading configuration, the chute means is moved back to alignment with the main tower and is removed. The bucket trolley can then run the entire length of the horizontal boom means to pick up materials from the hold of the ship and carry them back for direct deposit into a lighter situated between the main and back barges.

In the form of the invention as shown, two lighters will be situated between the main and back barges. The barge connecting means will include two main collars situated in parallel, adjacent relation to the operating space directly below the back bridge and will include two end collars situated at the opposite ends of the barges. Roofs to shield the lighters against heavy weather and roof framing to support the roofs are provided between adjacent main and end collars, and lighter hatch cover hoist assemblies depend from the roof framing and are in position to lift the hatch covers from the lighter hatches preparatory to aligning those hatches vertically under the back bridge. These lighter hatch cover hoist assemblies each include hatch cover hoists positioned to have movement transversely and longitudinally of the lighters so that the hatch covers can easily be removed and aligned for easy replacement on their hatches.

An operator's control cab is mounted to a control cab boom or spar which in turn is pivotably mounted to the main tower, and means is provided for swinging the cab from position directly over the lighters between the back and main barges to position adjacent the outboard boom in position to see clearly into the ship's hold.

BRIEF DESCRIPTION OF THE DRAWINGS

FIG. 1 is a perspective view of a bulk material unloader made according to the present invention with some details omitted;

FIG. 2 is a top plan view of the bulk unloader of FIG. 1 shown in an operative relationship to a cargo ship which is to be loaded or unloaded;

FIG. 3 is a side elevational view of the unloader and ship of FIG. 2 with parts omitted for clarity;

FIG. 10 is an enlarged fragmentary vertical sectional view with parts broken away taken on the line 10—10 in FIG. 5; and.

DETAILED DESCRIPTION OF THE PREFERRED EMBODIMENT

Figure 4:
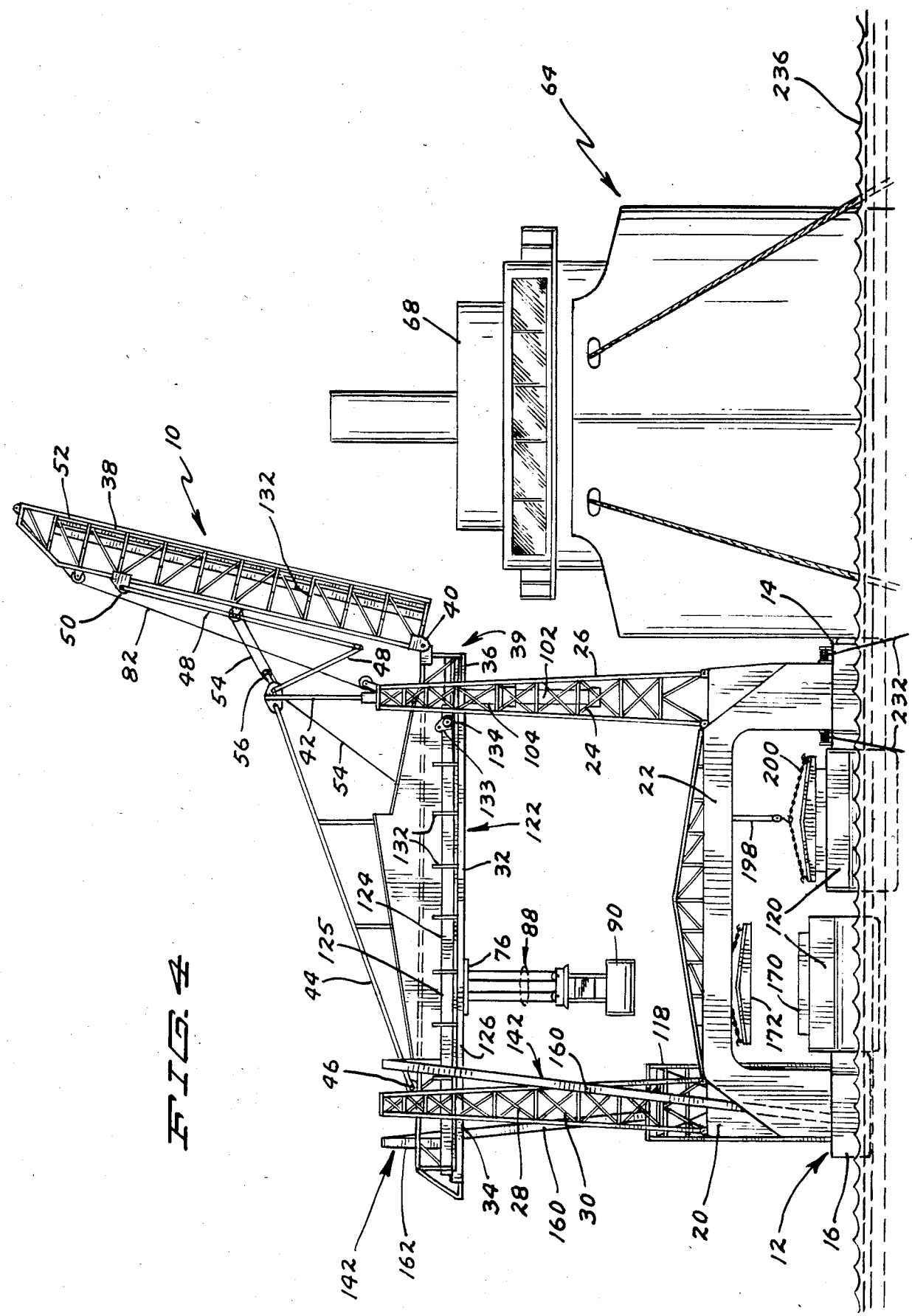
FIG. 4 is an end elevational view of the unloader and ship of FIGS. 2 and 3 as seen from the right in those figures, but disclosing an outboard boom of the unloader in a temporary elevated position to come into clearing relation to the superstructure of the ship as when the ship and unloader are being maneuvered into operative relationship with respect to each other.

A barge mounted, horizontal boom, bulk material unloader or vessel 10, made according to the present invention, includes barge means 12 which includes an elongate main barge or pontoon 14, and an elongate back barge or pontoon 16 situated in parallel, transversely spaced relation to the main barge. Main barge 14 is the port barge and back barge 16 is the starboard barge. The main and back barges are secured in fixed relationship with respect to each other by barge connecting means 18. Connecting means 18 includes a forward rigid main collar frame 20 and an aft rigid main collar frame 21 in spaced parallel relation to each other, each frame having a first end thereof fixedly mounted with respect to the main barge and a second end thereof fixedly mounted with respect to the back barge. Connecting means 18 also includes a bow end collar frame 22 and a stern end collar frame 23 each situated in parallel relation to the main frames and each having a first end thereof fixedly mounted with respect to the main barge and a second end thereof fixedly mounted with respect to the back barge. The end portion of vessel 10 adjacent frame 22 is known as the bow and the end adjacent frame 23 is the stern. Collar frames 20 and 22 are designated as forward collar frames; while collar frames 21 and 23 are designated as aft collar frames. All parts of vessel 10 between the collar frames 20 and 22 are forward parts and all parts between frames 21 and 23 are after or aft parts.

An upstanding main tower 24 is supported on the first ends of the main collar frames 20 and 21 which are connected to the port or main barge 14 and includes a main tower fore leg 26 and a main tower aft leg 27. An upstanding back tower 28 is supported over the second ends of the main collar frames mounted to the starboard or back barge 16 and includes a back tower fore leg 30 and a back tower aft leg 31. A back bridge 32 has a back portion 34 supported on back tower 28 and a front portion 36 supported on main tower 24.

As perhaps best seen in FIG. 4, the back gridge 32 extends somewhat outboard of the main tower 24, and an outboard boom 38 is pivotably mounted to it as at 40. Together, the back bridge 32 and the outboard boom 38 constitute a horizontal boom means or assembly 39.

An A-frame 42 extends upwardly from the main tower 24. A pair of back pendant struts 44,44 extend from the top of A-frame 42 to anchor points 46 on the back tower 28, while a pair of three-link pendant lines 48,48 extend from the top of A-frame 42 and are anchored as at 50 to a front portion 52 of the outboard boom 38 to support the boom 38 when it is in horizontal aligned position with respect to the back bridge 32 as most clearly illustrated in FIGS. 1, 5 and 9.

Figure 5:
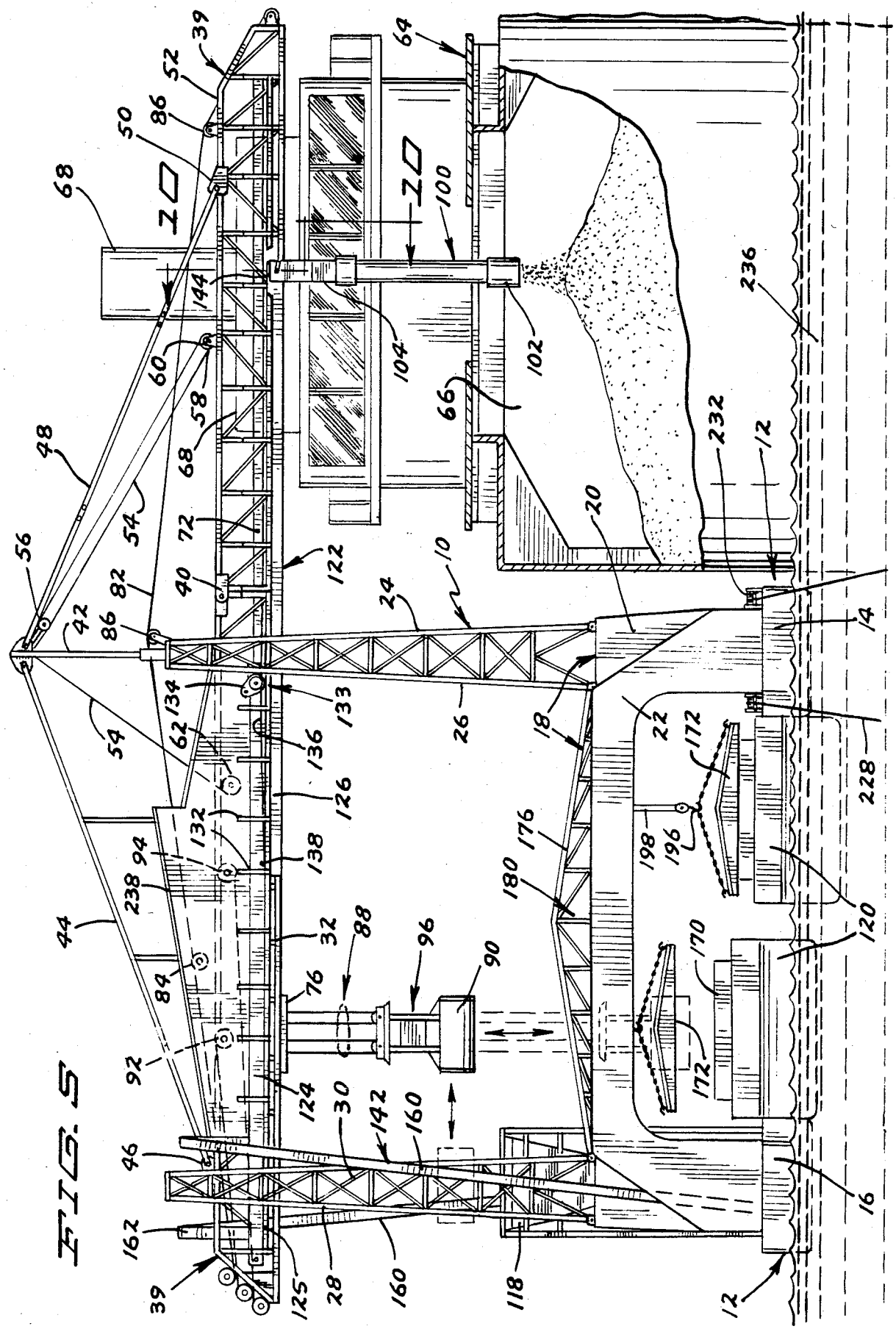
FIG. 5 is also an end elevational view of the unloader and the ship as seen from the right in FIGS. 2 and 3, but with the outboard boom in horizontal operational relationship to the remainder of the unloader and with a bulk material handling chute depending therefrom in position to load bulk material into the hold of the ship.

A boom hoist line 54 extends through multiple sheaves 56 at the top of A-frame 42 and multiple sheaves 58 mounted to the outboard boom 38 as at 60. Boom hoist line 54 is dead-ended to one of the axles on which the sheaves 56 or 58 turn, and the other end extends over one of the sheaves 56 to the drum of a outboard boom hoist 62 as clearly as seen in FIG. 5. By activating boom hoist 62 to wind the boom hoist line 54 on its boom hoist drum, the outboard boom 38 can be moved from position as seen in FIG. 5 to position as seen in FIG. 4. This boom-elevated position of FIG. 4 is particularly useful when moving a ship to be loaded or unloaded with respect to the bulk unloader of the invention, making it possible, for example, for a ship such as ship 64 to move longitudinally past the elevated boom without bringing the boom into contacting relationship to the ship superstructure 68.

When ship 64 and unloader 10 are in relatively fixed relationship with respect to each other, preparatory to loading or unloading from a hold 66 of the ship, outboard boom hoist 62 can be allowed to operate in reverse to allow the outboard boom 38 to move back to its normal horizontal operating position.

Figure 6:
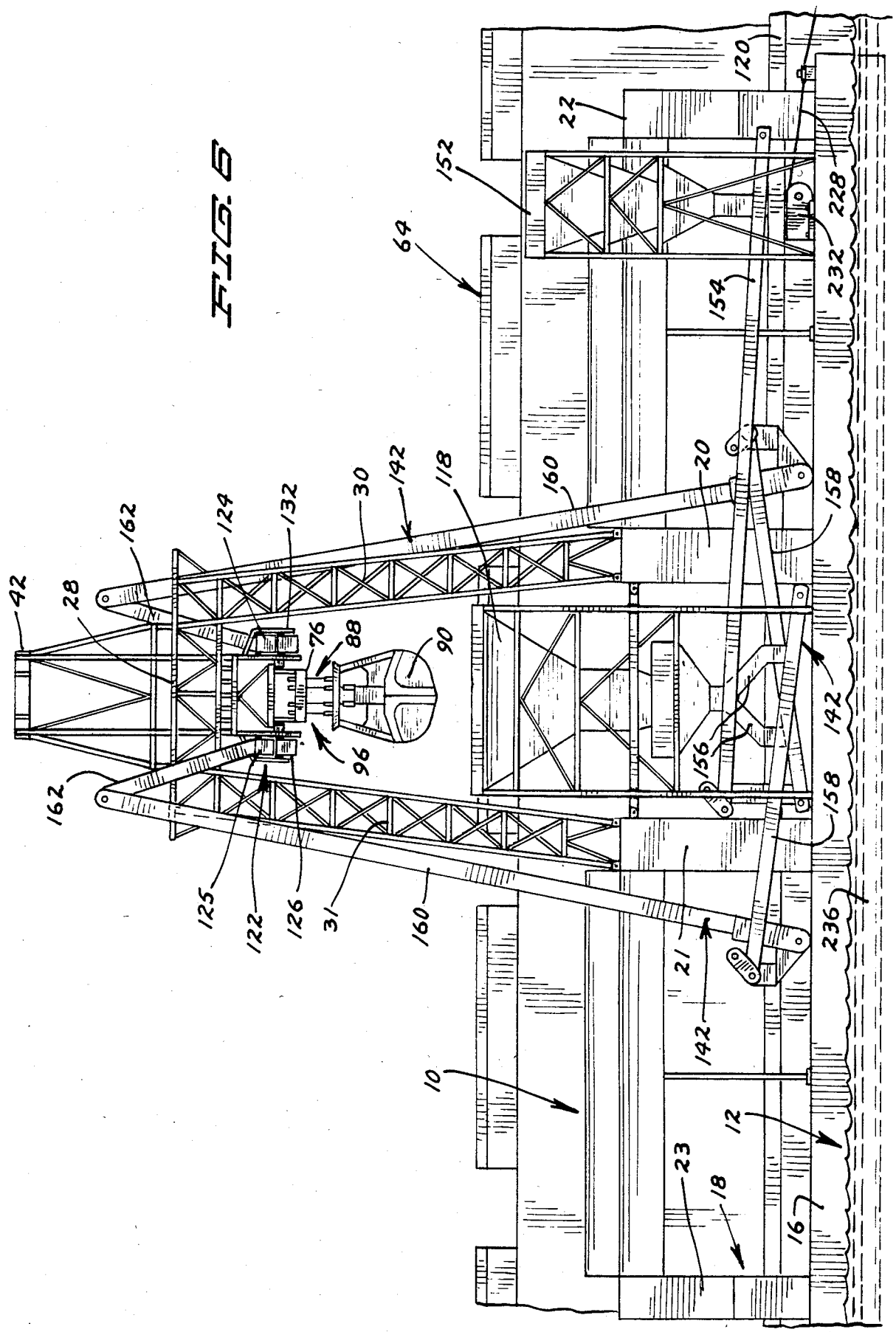
FIG. 6 is an enlarged side elevational view of the unloader and a fragmentary side view of the ship as seen in FIG. 3 with parts omitted for clarity of illustration.
Figure 7:
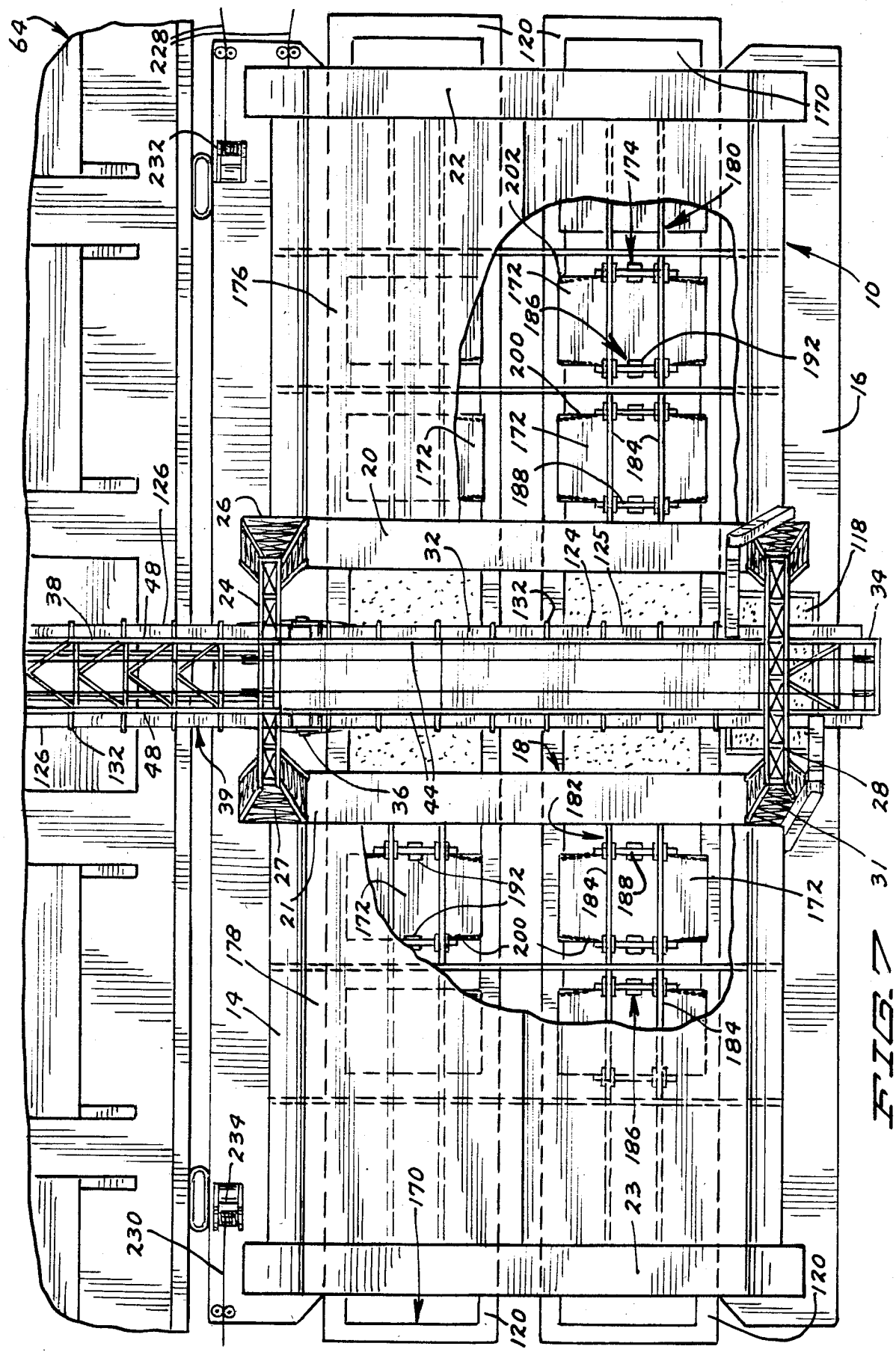
FIG. 7 is an enlarged fragmentary top plan view of the unloader and ship as seen in FIG. 2 with parts of a forward roof and an aft roof broken away to show a portion of roof framing and lighter hatch cover hoist assemblies underneath.
Figure 10:
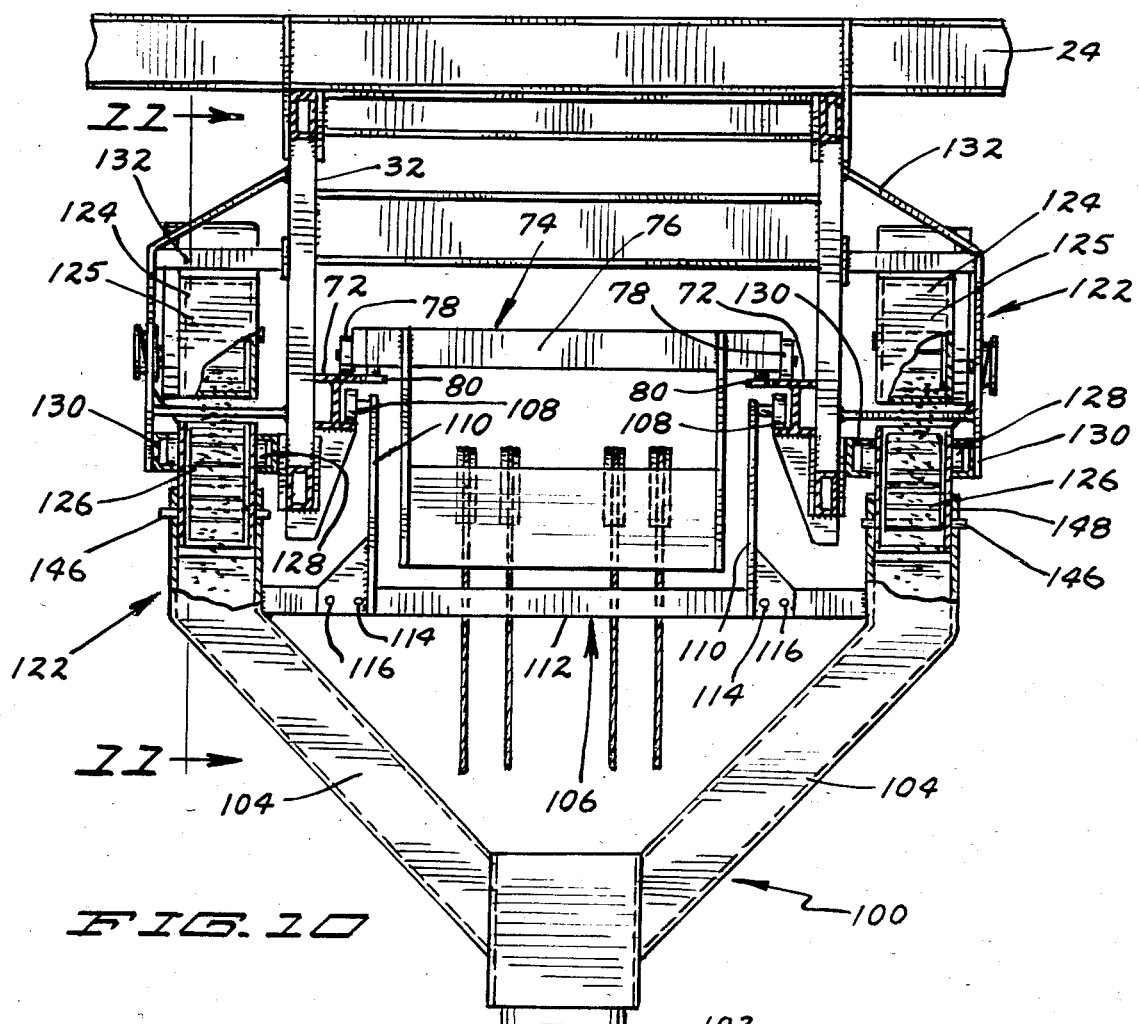

Mounted along the entire bottom length of horizontal boom means 39 is track means 70 which includes a pair of H-beam tracks 72,72 mounted in parallel, spaced-apart horizontal relationship with respect to each other and parallel to the longitudinal axis of the horizontal boom means as best seen in FIGS. 10 and 6. Each of the H-beam tracks 70 is made up of two parts aligned with each other when the outboard boom 38 is horizontal, and separated from each other on a vertical plane passing through the outboard boom pivot axis 40 so that the portion of the tracks 72,72 supported on the outboard boom can move with the boom when the boom is elevated.

Suspended from the track means 70 is a bucket trolley means 74 which includes a bucket trolley 76 movable along the track means through the instrumentality of bucket trolley support wheels 78,78 and bucket trolley alignment wheels 80,80. Also constituting part of the bucket trolley means 74 is a bucket trolley drive cable 82 wound around a bucket trolley winch drum 84 and running through appropriate bucket trolley guide pulleys 86 to attachment at opposite ends of the bucket trolley 76.

Thus, operation of the bucket trolley winch drum 84 in clockwise direction as seen in FIG. 5 causes the bucket trolley to move to the left as seen in that figure while operation of the winch drum 84 in counterclockwise direction will cause the bucket trolley to be moved to the right.

Suspended from bucket trolley 76 by bucket control lines indicated generally at 88 is a clam shell-type grab bucket 90. These control lines are wound on bucket close winch drum 92, on bucket hold winch drum 94, are connected to the bucket 90, and are reaved in any usual or preferred manner well known in the art to raise and lower the bucket, and to cause it to close and open. These bucket winch drums, bucket control lines, and the grab bucket together constitute a bucket means 96.

The bucket trolley 76 running on the H-beam tracks 72,72 is most clearly seen in FIG. 10. However, the section line 10—10 in FIG. 5 is drawn through a chute means 100, so that bucket trolley 76 is seen well in the background of FIG. 10.

Chute means 100, clearly shown in the foreground of FIG. 10, includes a hollow chute 102 supported by a pair of angled hollow bulk material conveyor legs 104,104 which lie in a vertical plane and which empty into the chute 102. Chute 102 and legs 104,104 are supported in part by a chute trolley 106 which includes chute trolley wheels 108,108 which run on the aforesaid H-beam tracks 72,72 and are rotatably mounted to vertical pivotable chute trolley support straps 110,110. These straps 110 are pivotably fastened to a horizontal chute trolley bar 112, outer ends of which are permanently mounted to conveyor legs 104,104. The chute trolley support straps 110,110 are pivotably mounted to the horizontal bar 112 on pivot pins 114,114. Removable fastening pins or bolts 116,116 pin the straps 110,110 in vertical position to maintain the wheels 108,108 in operative, supported relaion to the H-beams 72,72.

In order to move the bucket 90 and the bucket trolley 76 to the outer end of the outboard boom 38, it is necessary to bring the chute means 100 to position between main tower legs 26 and 27 and to remove the chute means 100, including chute trolley 106, from the H-beam tracks 72,72. For this purpose, removable fastening pins or bolts 116,116 are removed from provided openings in support straps 110,110, and in horizontal bar 112. This allows the straps to be pivoted to bring the chute trolley wheels 108,108 into clearing relationship with the horizontal tracks 72,72.

As perhaps most clearly seen in FIGS. 1 and 6, a main hopper 118 is mounted on the barge means 12 in position to receive bulk materials picked up by and discharged from the bucket means 96. In the form of the invention as shown, this hopper 118 is mounted on the back barge 16.

The clearance between the port main barge 14 and the starboard back barge 16 is such as to accommodate a pair of bulk material carrying cargo barges or lighters 120,120 in parallel relation to each other and to the bulk material unloader barges 14 and 16. In many of the figures, one of the barges is illustrated low in the water as when fully loaded and the other is illustrated higher in the water as when unloaded.

In addition to the track means 70, the horizontal boom means 39 also supports a horizontal bulk material conveyor means or assembly 122 which is parallel to the longitudinal axis of boom means 39. This conveyor means 122 includes a pair of permanently mounted, mutually parallel, endless, belt-type, top horizontal bulk material conveyors 124,124 supported on the back bridge 32 outside of the track means 70. Partly to control dust and to protect the bulk material from the weather, top conveyors 124,124 are encompassed by casings 125,125.

Conveyor means 122 also includes a pair of mutually parallel, endless, belt-type bottom horizontal bulk material conveyors 126,126, each mounted below one of the conveyors 124, and each movably mounted with respect to the horizontal boom means 39 through the instrumentality of wheels 128 running on horizontal conveyor support tracks 130,130. These tracks 130,130 are fixedly mounted to the back bridge 32 and the outboard boom 38 outwardly of the support tracks 72,72 partially through the instrumentality of hangers 132 which depend from the horizontal boom means 39, perhaps as best seen in FIG. 10. Side plates 148,148 are provided on either side of conveyors 126,126 to confine the material being conveyed against loss.

Figure 9:
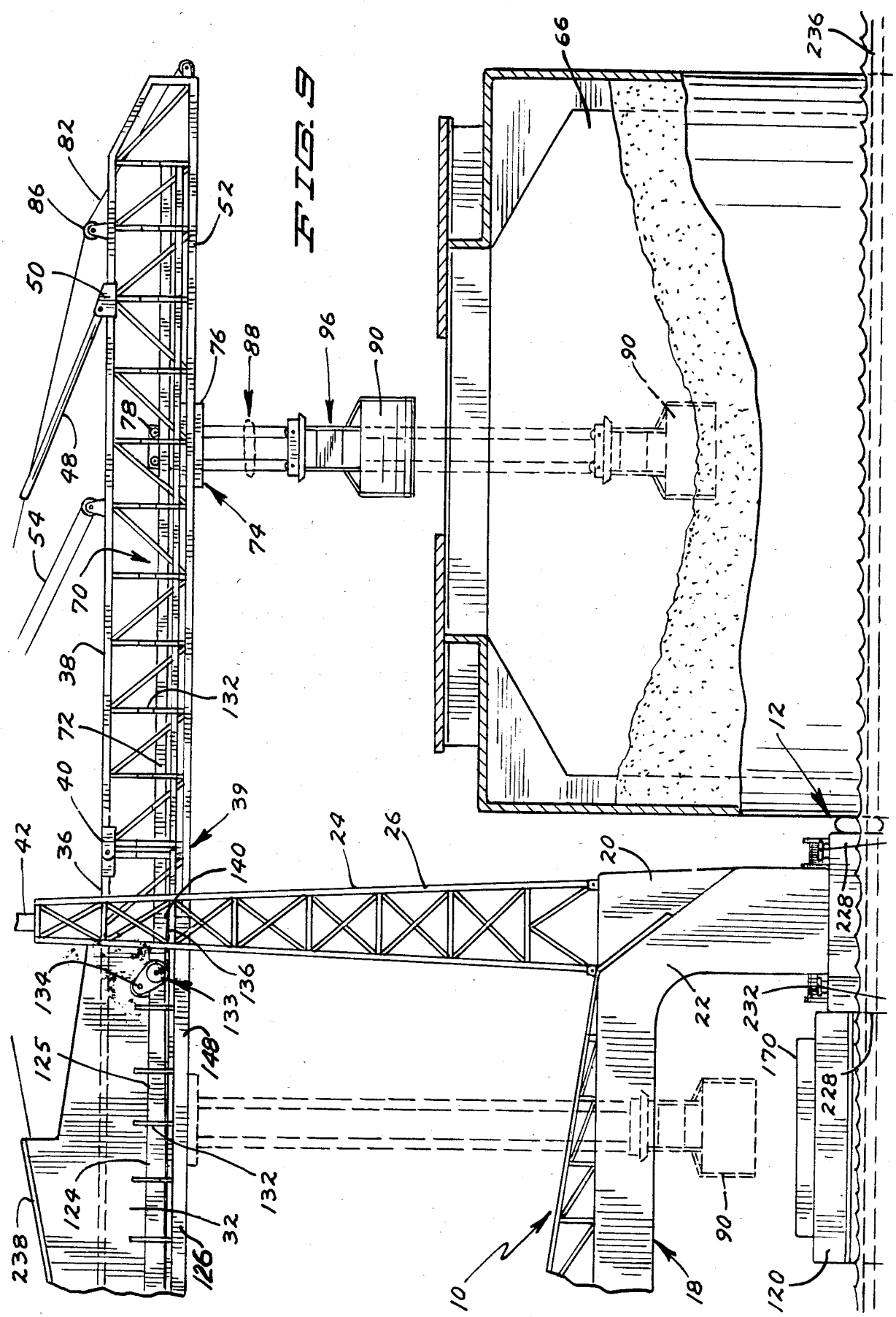
FIG. 9 is an enlarged fragmentary end elevational view of a portion of the unloader and the ship, but showing the outboard boom and a grab bucket positioned preparatory to unloading bulk material from a hold of the ship.
Figure 11:
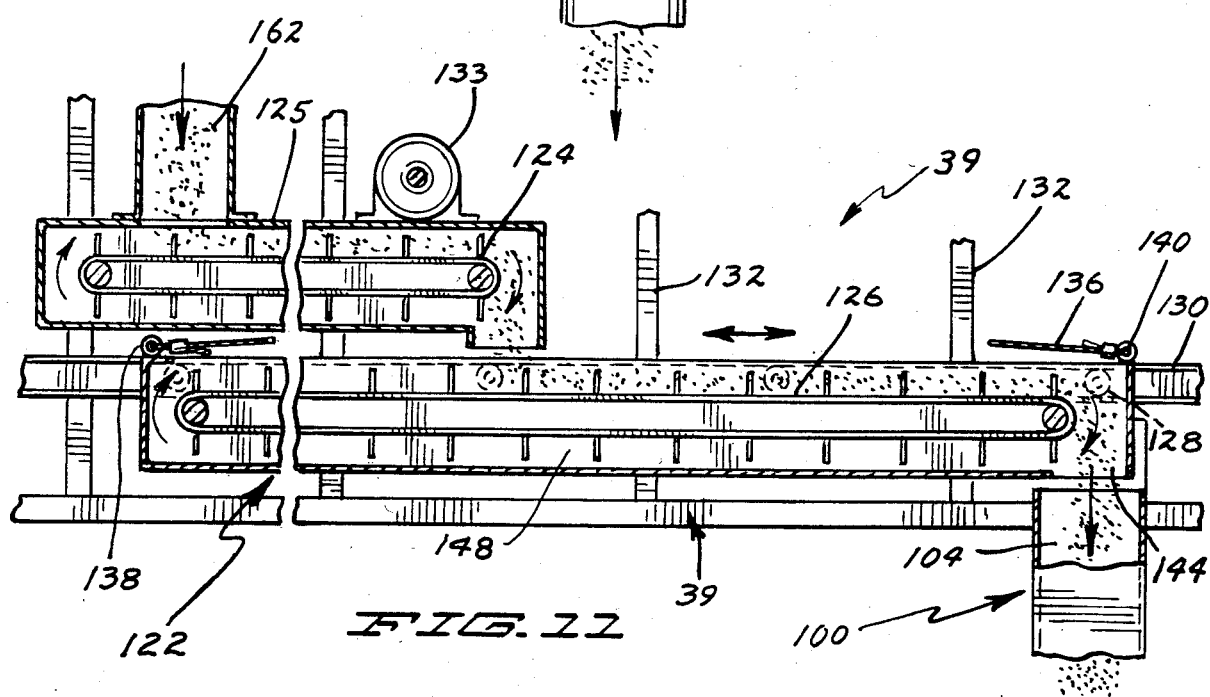
FIG. 11 is an enlarged, schematic, vertical sectional view taken on line 11—11 in FIG. 10, with parts omitted and parts broken away for clarity of illustration.

A bottom horizontal bulk material conveyor travel assembly 133 forms a part of the horizontal bulk material conveyor means 122 and includes at least one bottom horizontal conveyor travel winch 134 operably driving at least one bottom horizontal conveyor travel cable 136 which is fastened as at 138 to the back end of at least one of the bottom horizontal bulk material conveyors 126 and is fastened as at 140 to the front end of such conveyor. Conveyor travel winch 134 can be controlled and powered by any usual or preferred means to cause its winch drum to rotate in a clockwise direction as seen in FIG. 5. This will cause the movably mounted bottom horizontal conveyors 126,126 to trakvel to the right to position as seen in FIGS. 1, 5 and 11, for example. The winch 134, when the winch drum is rotated in counterclockwise direction, will cause the conveyors 126,126 to move to the left as seen in those figures. This movement to the left can be continued until the conveyors 126,126 lie substantially entirely below the fixed top horizontal conveyors 124,124. This position is illustrated in FIGS. 4 and 9.

When the unloader is in one of its modes of operation, an elevating conveyor means or assembly 142 can take bulk material from main hopper 118 and other sources and convey it to the upper surface of the horizontal endless belt of fixed top horizontal conveyors 124,124. This material is conveyed off of the front end of those conveyors and falls on the upper surface of the horizontal endless belt of movable bottom horizontal conveyors 126,126 and the material moves with those conveyors to be discharged off of their front ends. The position at any particular time of the movable conveyors 126 with respect to the horizontal boom means 39 and specifically with respect to the outboard boom 38 establishes a horizontal conveyor discharge point 144 at that time. See FIGS. 1, 5 and 11.

In addition to being partially supported on the horizontal chute trolley bar 112, the chute means 100 is also partially supported on, and connected to travel with, the outer end of the movably mounted bottom horizontal bulk material conveyors 126,126. This is accomplished through the instrumentality of ears 146,146 extending transversely and integrally outwardly from bottom conveyor side plates 148,148, and by diagonally upwardly slanting ear receiving slots 150 provided in the upper outer ends of the hollow bulk material conveyor legs 104,104. See FIG. 1 and FIG. 10. With the chute means 100 thus tied to the bottom horizontal conveyors 126,126, movement of these conveyors inwardly and outwardly through the instrumentality of bottom horizontal conveyor travel assembly 133 will result in the angled conveyor legs 104,104 always being directly beneath the horizontal conveyor discharge point 144, to the end that all material discharged at that point will pass through legs 104,104 and into and through chute 102.

In many cases if not all, it will be advantageous to constitute the chute 102 as a telescopic structure so that the discharge point of the chute 102 can be lowered down into the hold of a ship such as ship 64 or to other place for delivery of bulk material. This can be important in control of dust. See, for example, FIG. 5. The telescopic aspects of chute 102 can be of any usual or preferred construction (not shown).

As best seen in FIG. 6, in addition to the main hopper 118, a secondary or blending hopper 152 can be positioned on the back barge 16. This hopper 152 can be loaded from an auxiliary crane mounted on an auxiliary barge (not shown), and is useful to blend supplemental bulk material with the bulk materials being delivered to the main hopper 118 by the grab bucket 90 from lighters such as 120. For this purpose, a secondary hopper elevator leg 154 extends from the second hopper to feed into the elevating conveyor means 142.

The elevating conveyor means 142, in the form of the invention as shown, is fed by a pair of main hopper downspouts 156,156, feeding into a pair of first elevating conveyor legs 15,158. These legs feed into a pair of second elevating conveyor legs 160,160, each of these legs 160 feeding bulk material into one of a pair of elevating conveyor downspouts 162,162. Downspouts 162 each open through a provided opening in the top of one of the casings 125 onto the upper belt of one of the fixed top horizontal bulk material conveyors 124. Bulk materials deposited onto conveyors 124 are moved by those conveyors to be deposited on the upper surfaces of bottom horizontal conveyors 126,126 of conveyors 122 to be discharged therefrom at the horizontal conveyor discharge point 144 into the chute means 100.

Lighters such as lighters 120 are maneuvered to positions between the port and starboard barges 14 and 16 and are moored, each in fixed relation to its adjacent barge in any usual or preferred manner (not shown). Typically, each lighter 120 will include a plurality of hatches, a plurality of hatch openings 170 and a plurality of hatch covers 172 each covering one of the hatch openings 170. In order to load or unload bulk material into or from each such hatch, it will be necessary that its hatch opening 170 be aligned vertically underneath the track means 70 on the horizontal boom means 39. For this purpose, appropriate cargo lighter shifters including controls, winches, and appropriate fittings will be provided. These can be of any usual or preferred construction forming no part of the present invention per se, and are not shown herein.

Before each lighter hatch opening 170 is brought into position beneath the track means 70, its cover 172 must have been removed. In order to accomplish this, lighter hatch cover hoist assemblies 174 are provided between the forward main collar frame 20 and the forward end collar frame 22 and between the aft main collar frame 21 and the aft collar frame 23. These assemblies have the ability to pick off and to hold at least six hatch covers 172 from each of the two lighters 120.

In order to protect the bulk material in the lighters while the covers are removed and as the lighters are being moved to align successive hatches with the track means 70, a forward roof 176 is provided between the forward collars 20 and 22 and an aft roof 178 is provided between the aft collars 21 and 23. Appropriate forward roof framing 180 extends between forward collars 20 and 22 and appropriate aft roof framing 182 extends between aft collars 21 and 23. Each lighter hatch cover hoist assembly 174 includes a plurality of pairs of longitudinally extending I-beams 184,184 forming a part of the roof framing. Depending from each pair of I-beams 184,184 are several hatch cover hoist trolleys 186. Each trolley consists of a transversely extending I-beam 188 suspended from its pair of longitudinally extending I-beams 184,184 on rollers 190, thus allowing hatch cover hoist trolley 186 to move longitudinally along I-beams 184,184 and longitudinally with respect to the lighters moored therebeneath.

Figure 8:
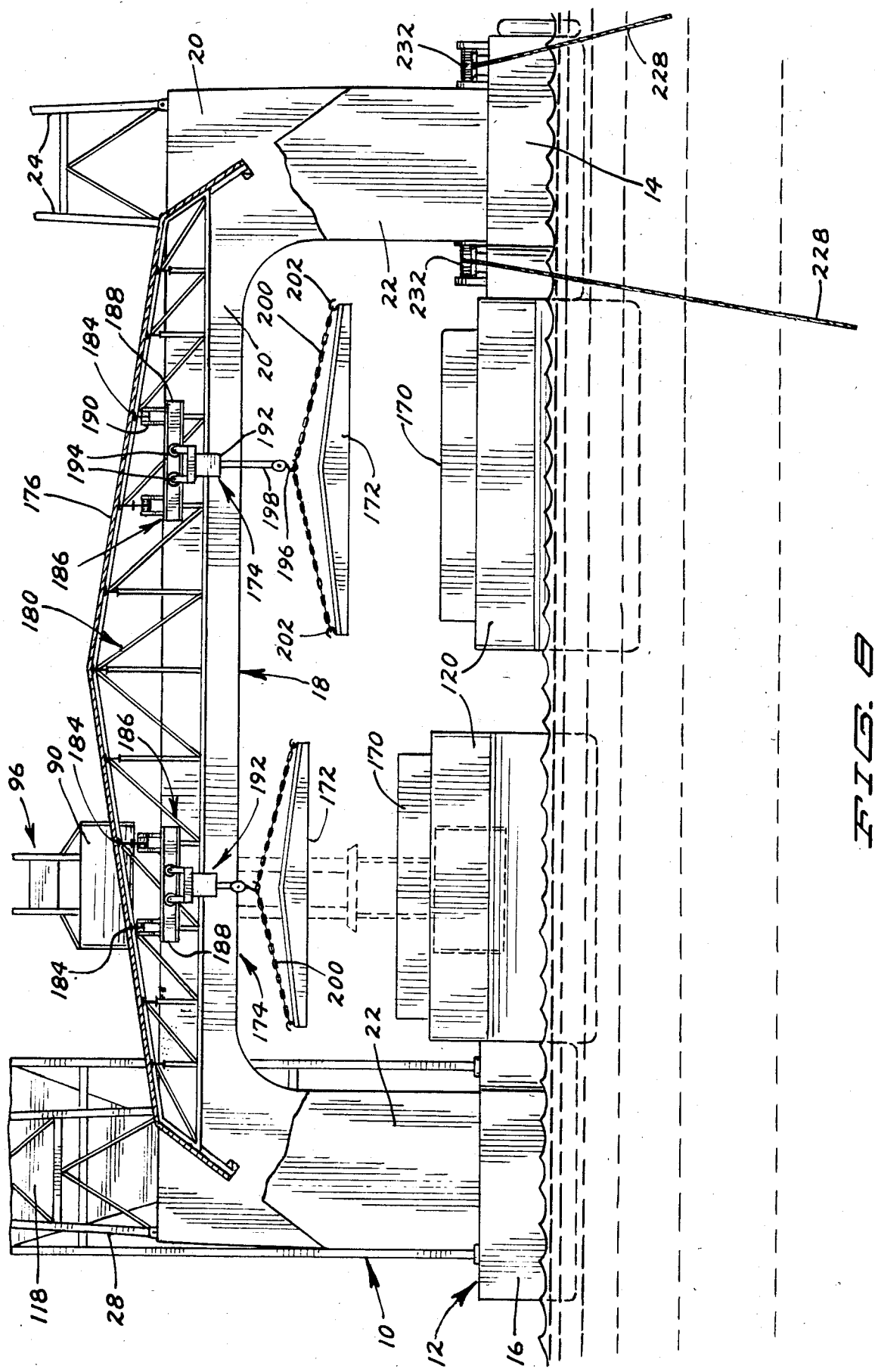
FIG. 8 is an enlarged, fragmentary end elevational view of the unloader of the invention with parts broken away and parts in section showing the details of the lighter hatch cover hoist assembly.

Each trolley 186 supports a hatch cover hoist 192 which is suspended from transverse I-beams 188 by rollers 194. This allows the hoist 192 to move transversely with respect to the lighter underneath it. The hoist includes an appropriate load hook 196 and hoist cable 198. Chains 200 are carried by load hook 196 and each hatch cover 172 is provided with hatch cover hooks 202, as best seen in FIG. 8. When a hatch cover is to be lifted, chains 200 are fastened in the hatch cover hooks 202.

Exact alignment of the lighter and its hatch opening 170 under a hatch cover hoist 192 is not necessary inasmuch as the hoist and its load hook 196 can be moved both in transverse and longitudinal direction to attain the proper alignment either preparatory to lifting a hatch cover 172 from a lighter or in replacing the hatch cover on the lighter.

Appropriate controls and power to activate each hoist 192 can be provided in any usual or preferred manner (not shown).

An operator's control cab 206 is mounted at an outer end of a control cab boom or spar 208, and the inner end of spar 208 is pivotably mounted to a crow's nest 216 on the fore leg 26 of the main tower 24 as at 210. Cab suspension lines 212 extend from the top of main tower 26 to cab 206 and outer end portions of the cab spar 208 to support the weight of the cab and the spar. Spar 208 includes a catwalk 214 extending from the crow's nest 216 to the operator's control cab 206.

A control cab assembly 218 includes the operator's control cab 206, the cab spar 208, suspension lines 212, catwalk 214 and crow's nest 216. Assembly 218 also includes a control cab drive means 220 mounted between the cab spar 208 and the crow's nest 216 and operable to move the cab between a first position as seen in FIG. 1 where an operator in the cab can see clearly down into the lighter hatch openings 170 which are in vertical alignment with the back bridge 32, and a second position, not shown, where the operator in the cab can see clearly down into the hold 66 of ship 64 in vertical alignment below outboard boom 38. See FIG. 1. For clarity of illustration, the control cab assembly 218 has been omitted from other figures.

OPERATION

The bulk material unloader 10 of the invention can be operated to transfer bulk materials from cargo lighter to ship, from ship to cargo lighter, from lighter to shore, from shore to lighter, and from shore to ship. A description of the operation of the unloader in transferring materials from cargo lighters to ship, and of the operation of the unloader is transfering bulk materials from ship to cargo lighter will follow.

For offloading bulk materials from ship to lighter and for onloading bulk materials from lighter to ship, the unloader 10 can be moored adjacent the side of an anchored ship to be movable longitudinally of the ship to selectively position the outboard boom 38 successively vertically over the various ship hatches to give access successively to the holds which are to be loaded or unloaded. Typically this will happen in "midstream" where there is sufficient depth to accommodate the draft of the ship when loaded. Where, as is often the case, this is in a river channel, the ship will be permanently anchored or moored to be in fixed relationship with respect to the bottom of the channel or other body of water. As shown, this is accomplished through the instrumentality of at least two forward and two aft mooring lines 226. The outer ends of lines 226 are not shown, but all will be firmly fastened in any usual or preferred manner.

The bulk material unloader 10 of the invention will be held with its main or port barge 14 in adjacent relation to the ship 64 through the instrumentality of at least two bow mooring lines 228,228 and at least one stern mooring line 230 all anchored or otherwise fixedly mounted at their outer ends in any usual or preferred manner (not shown).

Unloader bow mooring lines 228 are attached to bow mooring winches 232,232 mounted on the main or port barge 14. Stern mooring line 230 is attached to a stern mooring winch 234. As perhaps best seen in FIG. 2, with ship 64 fixedly positioned over one place on the bottoms and afloat on water/liquid 236, mooring lines 228,228 and 230, when taut, will positively position the unloader 10 with respect to the ship. By paying out on bow lines 228,228 and, at the same time, taking up on stern line 230, the unloader can be moved longitudinally along the side of the ship to successively position the overhanging boom in vertical alignment with each of the hatches.

To position the unloader to operate to transfer bulk materials from lighters to the ship in the configuration as seen in FIGS. 1 and 5, the movable bottom horizontal conveyors 126,126 will be retracted to the left until they and the chute means 100 are positioned as seen in FIG. 4. The outboard boom 38 will be elevated as seen in that figure, and the unloader 10 will be moved in to position alongside a ship such as the ship 64. Once superstructure 68 of the ship has been cleared, the outboard boom 38 will be lowered to position as seen in FIG. 5. The bottom conveyors 126,126 and the chute 102 will be moved to the right until the chute is vertically above the hatch opening of the hold 66 to be unloaded, and the chute will then be extended to position inside the hold to position as seen in FIG. 5.

A plurality of lighter hatch covers 172 will be removed from the lighters by the lighter hatch cover hoist assemblies 174, and one uncovered hatch of each of the lighters 120,120 will be situated vertically under the back bridge 32. Bucket trolley means 74 and grab bucket 90 will be operated to lift all the bulk materials first from a hatch of one of the lighters 120 and then from a hatch of the other and will deposit those materials into the main hopper 118. After a hatch on one of the lighters has been emptied, and while the aligned batch on the second lighter is being emptied, the first lighter will be moved longitudinally to bring another filled batch into vertical alignment with the back bridge.

Main hopper 118 can have assocated with it metering means and weighing means of any usual or preferred construction. Elevating conveyor means 142 will be operable to carry all bulk materials leaving main hopper downspouts 156,156 and all blended material having secondary hopper elevator leg 154 to horizontal bulk conveyor means 122, and this conveyor means will deliver such material into the chute means 100 to be deposited into the hold 66 of the ship 64 as seen in FIG. 5.

When the hold 66 has been filled to capacity, conveying means 142 and 122 will be deactivated, chute 102 will be telescoped to withdraw it from the hold, and bow mooring winches 232,232 and stern mooring winch 234 will be activated to move the unloader 10 longitudinally of the ship until chute 102 is aligned with yet another hold to be filled. At this point, the elevating conveyor means 142 and the horizontal conveyor means 122 will be reactivated to begin to fill the new hold.

A bulk unloader made according to the present invention, under test, has unloaded as much as 2000 tons of bulk material in one hour from lighter to ship.

In order to unload a ship, it is necessary that the bucket trolley means 74 and the grab bucket 90 be movable between a position along and under an outer end portion of the outboard boom 38 and a position vertically above a hatch opening 170 of a lighter 120. In order to do this, the chute 102, the hollow bulk material conveyor legs 104,104 and the chute trolley 106 must be removed from depending relationship with track means 70. This is accomplished by moving the chute means 102 to position between legs 26 and 27 of main tower 24 as seen in FIG. 4, removing fastening pins 116,116 and pivoting chute trolley support straps 110,110 to bring the chute trolley wheels 108,108 in clearing relation to the H-beam tracks 72. Chute means 100 is then lifted to raise the conveyor legs 104,104 into clearing relationship with respect to ears 146,146. The then disconnected chute means 100 will be lowered by use of any usual or preferred hoisting means (not shown) and removed to position from between the main tower legs 26 and 27.

In this configuration, the bucket trolley 76 and consequently the grab bucket 90 can be moved from one end of the horizontal boom means 39 to the other. With the outboard boom 38 and bucket trolley 76 in alignment vertically above the hatch of a ship hold 66 to be unloaded, grab bucket 90 will be lowered into the hold, filled with bulk material, and hoisted to clearing relationship with respect to the hold. The bucket trolley will be moved to the left from the position as seen in FIG. 9, for example, and with the bucket 90 in vertical alignment with a hatch opening 170, the bucket will be lowered to position where material in it can be discharged into the aligned hatch of the lighter 120. When one such hatch is filled, the bucket will deliver materials into an aligned hatch on the other lighter until the first lighter can be moved to position an empty hatch in alignment under the back bridge 32. When a first lighter is filled, it can be removed and a third put in its place while a hatch of the second is being filled. The bucket 90 and bucket trolley 76 can thus be continuously operated until the ship's hold is emptied.

As a particular hatch on a lighter has been either filled or emptied as desired according to the mode of operation, the lighter can be moved to position another hatch under the bucket tracks, and hatch cover 172 can be lowered by the appropriate hatch cover hoist 192 to close the particular hatch. By always having at least one hatch of one of the lighters operationally aligned under the back bridge 32, and by often having one hatch of each of the lighters so aligned, the lighter hatch covers 172 can be removed and replaced with no lost loading-/unloading time due to this operation.

Further, when handling moisture sensitive bulk materials, in heavy winds and/or in times of precipitation, only those lighter hatches immediately aligned under the back bridge 32 and those hatches immediately adjacent the aligned hatches need be without hatch covers 172. There is a back bridge roof 238 covering the back bridge and the material underneath it. Thus loading/unloading can continue to take place as far as the bulk material in the lighters is concerned under the protection of that bridge roof 238, forward roof 176 and aft roof 178 in all but the most severe weather.

Although the present invention has been described with reference to preferred embodiments, workers skilled in the art will recognize that changes may be made in form and detail without departing from the spirit and scope of the invention.

What is claimed:

1. A barge mounted, horizontal boom, bulk material loader includes:
    A. barge means for supporting the unloader on the surface of a body of liquid and including an elongate main barge and an elongate back barge;
    B. connecting means fixedly mounted on and extending between the barges in spaced relation to the surface of the liquid body and securing the barges in transversely spaced relation to each other, the spacing between the barges being sufficient to accommodate at least one elongate bulk material lighter between the barges;
    C. an upstanding main tower carried by said main barge and an upstanding back tower carried by said back barge;
    D. horizontal boom means including:
        (1) a back bridge supported on and extending between said towers, and
        (2) an outboard boom supported by the towers and normally extending away from the back bridge in parallel, end-to-end, longitudinal alignment with the back bridge;
    E. horizontal bulk material conveyor means supported in aligned parallel relation to the horizontal boom means in position to deliver bulk materials deposited thereon to a horizontal conveyor discharge point along the outboard boom;
    F. chute means supported on said outboard boom to lie below said horizontal conveyor discharge point in position to receive bulk material from said horizontal conveyor means and to discharge it to a location outboard of the main tower;
    G. track means supported by said towers on the boom means to lie in aligned, parallel relation to the back bridge and to the outboard boom, the track means extending between a back portion of the back bridge, and an outer portion of the outboard boom;
    H. bucket trolley means including:
        (1) a bucket trolley movably supported on the track means, and
        (2) means for moving the bucket trolley along the track means;
    I. bucket means operably supported from the bucket trolley means and movable between
        (1) digging positions below the boom means and inboard of the horizontal conveyor discharge point,
        (2) elevated positions for movement with the trolley means along and under the track means; and
        (3) discharge positions along the boom means;
    J. hopper means supported on the barge means in position to receive bulk materials discharged from the bucket means;
    K. elevating conveyor means operative to convey bulk materials from said hopper means to said horizontal bulk material conveyor means;
    L. wherein said barge connecting means includes:
        (1) a pair of main collar frames in spaced parallel relation to each other and to the longitudinal axis of the horizontal boom means, one main collar frame being located on each side of said boom means, and
        (2) a pair of end collar frames, each in parallel relation to the main frames, one connecting the bow and one connecting the stern of the main and back barges to each other;
    M. wherein roof framing extends between at least one end collar frame and its adjacent main collar frame; and
    N. wherein a lighter hatch cover hoist assembly depends from said roof framing and includes:
        (1) a plurality of cover hoist trolleys mounted for limited movement in a horizontal plane in longitudinal and transverse directions with respect to the barges,
        (2) at least one lighter hatch cover hoist depending from each trolley, each hoist having a load line and a load hook depending therefrom, and (3) strap means depending from each load hook adapted for attachment to a lighter hatch cover.

2. The bulk material unloader of claim 1 wherein:

O. the main and back barges are in parallel relation to each other and are spaced apart sufficiently to accommodate at least two elongate bulk material lighters in parallel relation to each other and to the barges;

P. the roof framing extends both between the bow mounted end collar frame and its adjacent main frame and between the stern mounted end collar frame and its adjacent main frame;

Q. a forward roof and an aft roof cover the forward and aft roof framing respectively; and R. a plurality of said cover hoists and trolleys are mounted in position to remove and replace hatch covers from said side-by-side lighters lying in the liquid between the main and back barges and lying under both the forward and the aft roof framing.

3. A barge mounted, horizontal boom, bulk material unloader includes:

A. barge means for supporting the unloader on the surface of a body of liquid and including an elongate main barge and an elongate back barge;

B. connecting means fixedly mounted on and extending between the barges in spaced relation to the surface of the liquid body and securing the barges in transversely spaced relation to each other, the spacing between the barges being sufficient to accommodate at least one elongate bulk material lighter between the barges;

C. an upstanding main tower carried by said main barge and an upstanding back tower carried by said back barge;

D. horizontal boom means including:
  (1) a back bridge supported on and extending between said towers, and
  (2) an outboard boom supported by the towers and normally extending away from the back bridge in parallel, end-to-end, longitudinal alignment with the back bridge;

E. horizontal bulk material conveyor means supported in aligned parallel relation to the horizontal boom means in position to deliver bulk materials deposited thereon to a horizontal conveyor discharge point along the outboard boom;

F. chute means supported on said outboard boom to lie below said horizontal conveyor discharge point in position to receive bulk material from said horizontal conveyor means and to discharge it to a location outboard of the main tower;

G. track means supported by said towers on the boom means to lie in aligned, parallel relation to the back bridge and to the outboard boom, the track means extending between a back portion of the back bridge, and an outer portion of the outboard boom;

H. bucket trolley means including:
  (2) a bucket trolley movably supported on the track means, and
  (2) means for moving the bucket trolley along the track means;

I. bucket means operably supported from the bucket trolley means and movable between
  (1) digging positions below the boom means and inboard of the horizontal conveyor discharge point,
  (2) elevated positions for movement with the trolley means along and under the track means, and
  (3) discharge positions along the boom means;

J. hopper means supported on the barge means in position to receive bulk materials discharged from the bucket means;

K. elevating conveyor means operative to convey bulk materials from said hopper means to said horizontal bulk material conveyor means;

L. wherein said barge connecting means includes:
  (1) a pair of main collar frames in spaced parallel relation to each other and to the longitudinal axis of the horizontal boom means, one main collar frame being located on each side of the boom means, and
  (2) a pair of end collar frames, each in parallel relation to the main frames, one connecting the bow and one connecting the stern of the main and back barges to each other;

M. wherein said upstanding main tower includes two spaced-apart legs, each leg being supported on one of the main collar frames; and N. wherein said upstanding back tower includes two spaced-apart legs, each leg being supported on one of the main collar frames.

4. A barge mounted, horizontal boom, bulk material unloader includes:

A. barge means for supporting the unloader on the surface of a body of liquid and including an elongate main barge and an elongate back barge;

B. connecting means fixedly mounted on and extending between the barges in spaced relation to the surface of the liquid body and securing the barges in transversely spaced relation to each other, the spacing between the barges being sufficient to accommodate at least one elongate bulk material lighter between the barges;

C. an upstanding main tower carried by said main barge and an upstanding back tower carried by said back barge;

D. horizontal boom means including:
  (1) a back bridge supported on and extending between said towers, and
  (2) an outboard boom supported by the towers and normally extending away from the back bridge in parallel, end-to-end, longitudinal alignment with the back bridge;

E. horizontal bulk material conveyor means supported in aligned parallel relation to the horizontal boom means in position to deliver bulk materials deposited thereon to a horizontal conveyor discharge point along the outboard boom;

F. chute means supported on said outboard boom to lie below said horizontal conveyor discharge point in position to receive bulk material from said horizontal conveyor means and to discharge it to a location outboard of the main tower;

G. track means supported by said towers on the boom means to lie in aligned, parallel relation to the back bridge and to the outboard boom, the track means extending between a back portion of the back bridge, and an outer portion of the outboard boom;

H. bucket trolley means including:
  (1) a bucket trolley movably supported on the track means, and
  (2) means for moving the bucket trolley along the track means;

I. bucket means operably supported from the bucket trolley means and movable between (1) digging positions below the boom means and inboard of the horizontal conveyor discharge point,
(2) elevated positions for movement with the trolley means along and under the track means, and
(3) discharge positions along the boom means;

J. hopper means supported on the barge means in position to receive bulk materials discharged from the bucket means;

K. elevating conveyor means operative to convey bulk materials from said hopper means to said horizontal bulk material conveyor means;

L. wherein said barge connecting means includes:
  (1) a pair of main collar frames in spaced parallel relation to each other and to the longitudinal axis of the horizontal boom means, one main collar frame being located on each side of the boom means, and
  (2) a pair of end collar frames, each in parallel relation to the main frames, one connecting the bow and one connecting the stern of the main and back barges to each other;

M. wherein a back end portion of said outboard boom is pivotably mounted to a front end portion of the back bridge;

N. wherein means is provided to pivot the outboard boom upwardly to move it into clearing relation with respect to superstructure of a ship or other obstruction where the bulk material unloader is being moved relative to such obstruction preparatory to, or following, operation of the unloader for its intended purpose;

O. wherein said upstanding main tower includes two spaced-apart legs, each leg being supported on one of the main collar frames; and P. wherein said upstanding back tower includes two spaced-apart legs, each leg being supported on one of the main collar frames.

5. The bulk material unloader of claim 4 wherein:

Q. an A-frame extends upwardly from said main tower, and said outboard boom is supported by pendant lines extending from an outer portion of said outboard boom to the top of said A-frame and from the top of the A-frame to said back tower; and R. said means to pivot the outboard boom upwardly includes a boom hoist winch mounted with respect to the back bridge, a first set of boom hoist sheaves rotatably mounted with respect to an upper portion of the A-frame, a second set of boom hoist sheaves rotatably mounted with respect to an outer portion of the outboard boom, and a boom hoist cable operably connected to a drum of the boom hoist winch and reeved through the first and second sets of the boom hoist sheaves.

6. The bulk material unloader of claim 4 wherein:
Q. the horizontal bulk conveyor means includes:
  (1) a fixed top horizontal bulk material conveyor supported with respect to, and in parallel relation to, the back bridge,
  (2) a movable bottom horizontal bulk material conveyor supported with respect to the horizontal boom means on horizontal conveyor support track means which are mounted on the horizontal boom means in position to support the bottom horizontal conveyor below the top horizontal bulk material conveyor in position to receive bulk materials leaving a forward end of that top conveyor, said bottom conveyor being movable between an inboard position under substantially the entire length of the back bridge and an outboard position wherein the horizontal conveyor discharge point is adjacent the farthestmost end of the outboard boom, and
  (3) means for moving the bottom horizontal conveyor between said outboard and said inboard positions; and R. said chute means is fastened to the outboard end of said bottom horizontal conveyor to move with said conveyor so that the chute means lies in position to receive bulk materials discharged from the horizontal conveyor discharge point wherever it and said outboard end of said bottom conveyor are situated.

7. The bulk material unloader of claim 6 wherein:

S. the horizontal bulk material conveyor means includes two fixed top horizontal bulk material conveyors, one on each side of the back bridge and two bottom horizontal bulk material conveyors, one under each fixed top conveyor;

T. said elevating conveyor means is operative to convey bulk materials from the hopper means to each of the fixed top horizontal bulk material conveyors; and U. the chute means includes a pair of hollow bulk conveyor legs each in alignment under the outboard end of one of the bottom horizontal conveyors, said chute conveyor legs converging into a vertical chute located below and in vertical alignment with the trolley track means.

8. The bulk material unloader of claim 7 wherein:

V. said chute means is removable from the horizontal boom means including the outboard boom and is disconnectable from the outboard end of the bottom horizontal bulk material conveyors to thus permit clear passage of said bucket trolley along the entire length of said track means.

9. A barge mounted, horizonttal boom, bulk material unloader includes:

A. barge means for supporting the unloader on the surface of a body of liquid and including an elongate main barge and an elongate back barge;

B. barge connecting means fixedly mounted on and extending between the barges above the surface of the liquid body and securing the barges in transversely spaced relation to each other, the spacing between the barges being sufficient to accommodate at least one elongate bulk material lighter between the barges;

C. an upstanding main tower carried by said main barge and an upstanding back tower carried by said back barge;

D. horizontal boom means including:
  (1) a back bridge supported on and extending between said towers, and
  (2) an outboard boom supported by the towers and extending away from the back bridge in parallel, longitudinal alignment with the back bridge;

E. horizontal bulk material conveyor means supported in aligned parallel relation to the horizontal boom means in position to deliver bulk materials deposited on it to a horizontal conveyor discharge point along the outboard boom;

F. chute means supported on said outboard boom to lie below said horizontal conveyor discharge point in position to receive bulk material from said horizontal conveyor means and to discharge it to a location outboard of the main tower;

G. track means supported by said towers on the horizontal boom means to lie in aligned, parallel relation to the back bridge and to the outboard boom, the track means extending at least between a back portion and a forward portion of the back bridge;

H. bucket trolley means including:
   (1) a bucket trolley movably supported on the track means, and
   (2) means for moving the bucket trolley along the track means;

I. bucket means operably supported from the bucket trolley means and movable between:
   (1) digging positions for picking up bulk materials from lighters situated between the barges, and
   (2) elevated positions for movement with the trolley means along and under the track means;

J. bulk material receiving means supported on the barge means in position to receive bulk materials picked up by and discharged from the bucket means;

K. elevating conveyor means operative to convey bulk materials from said receiving means to said horizontal bulk material conveyor means;

L. wherein said barge connecting means includes:
   (1) a pair of main collar frames in spaced parallel relation to each other and to the longitudinal axis of the horizontal boom means, one main collar frame being located on each side of the boom means, and
   (2) a pair of end collar frames, each in parallel relation to the main frames, one connecting the bow and one connecting the stern of the main and back barges to each other;

M. wherein said upstanding main tower includes two spaced-apart legs, each leg being supported on one of the main collar frames; and N. wherein said upstanding back tower includes two spaced-apart legs, each leg being supported on one of the main collar frames.

10. The bulk material unloader of claim 9 wherein:

O. an operator's control cab is provided and houses controls for various functions of the unloader including the bucket trolley means and the bucket means;

P. the control cab is fixedly mounted on a control cab boom, the boom being pivotably mounted to the main tower and the boom and cab being movable horizontally on a radius about the main tower, the positioning of the parts being such that the cab is movable between a first position where there is a line of sight between an operator's position in the cab and the interior of a lighter situated between the barges and in underlying relation to the back bridge and a second position where there is a line of sight between the operator's position and the interior of the hold of a ship which is in underlying relation to the outboard boom; and Q. means is provided to move the cab between its first and second positions.

11. A barge mounted, horizontal boom, bulk material unloader includes:

A. barge means for supporting the unloader on the surface of a body of liquid and including an elongate main barge and an elongate back barge;

B. barge connecting means fixedly mounted on and extending between the barges above the surface of the liquid body and securing the barges in transversely spaced relation to each other, the spacing between the barges being sufficient to accommodate at least one elongate bulk material lighter between the barges;

C. an upstanding main tower carried by said main barge and an upstanding back tower carried by said back barge;

D. horizontal boom means including:
   (1) a back bridge supported on and extending between said towers, and
   (2) an outboard boom supported by the towers and extending away from the back bridge in parallel, longitudinal alignment with the back bridge;

E. horizontal bulk material conveyor means supported in aligned parallel relation to the horizontal boom means in position to deliver bulk materials deposited on it to a horizontal conveyor discharge point along the outboard boom;

F. chute means supported on said outboard boom to lie below said horizontal conveyor discharge point in position to receive bulk material from said horizontal conveyor means and to discharge it to a location outboard of the main tower;

G. track means supported by said towers on the horizontal boom means to lie in aligned, parallel relation to the back bridge and to the outboard boom, the track means extending at least between a back portion and a forward portion of the back bridge;

H. bucket trolley means including:
   (1) a bucket trolley movably supported on the track means, and
   (2) means for moving the bucket trolley along the track means;

I. bucket means operably supported from the bucket trolley means and movable between:
   (1) digging positions for picking up bulk materials from lighters situated between the barges, and
   (2) elevated positions for movement with the trolley means along and under the track means;

J. bulk material receiving means supported on the barge means in position to receive bulk materials picked up by and discharged from the bucket means;

K. elevating conveyor means operative to convey bulk materials from said receiving means to said horizontal bulk material conveyor means;

L. wherein said barge connecting means includes:
   (1) a pair of mean collar frames in spaced parallel relation to each other and to the longitudinal axis of the horizontal boom means, one main collar frame being located on each side of the boom means, and
   (2) a pair of end collar frames, each in parallel relation to the main frames, one connecting the bow and one connecting the stern of the main and back barges to each other;

M. at least an outboard portion of said horizontal boom means is pivotably mounted with respect to said upstnding towers, said barge connecting means and said barge means;

N. means is provided to pivot at least said outboard portion of said horizontal boom means upwardly to move it into clearing relation with respect to superstructure of a ship or other obstruction when the bulk material unloader is being moved relative to such obstruction preparatory to, or following, operation of the unloader for its intended purpose;

O. wherein said upstanding main tower includes two spaced-apart legs, each leg being supported on one of the main collar frames; and
P. wherein said upstanding back tower includes two spaced-apart legs, each leg being supported on one of the main collar frames.

12. The bulk material unloader of claim 11 wherein:
Q. a frame extends upwardly of said main tower above said horizontal boom means; and
R. said means to pivot at least on outboard portion of said horizontal boom means upwardly includes boom hoist means operably connected between an upper portion of said frame and said pivotably mounted portion of said horizontal boom means.

13. The bulk material unloader of claim 11 wherein:
Q. the horizontal bulk conveyor means includes:
  (1) a fixed top horizontal bulk material conveyor supported with respect to, and in parallel relation to, the back bridge,
  (2) a movable bottom horizontal bulk material conveyor supported with respect to the horizontal boom means on horizontal conveyor support track means which are mounted on the horizontal boom means in position to support the bottom horizontal bulk material conveyor below the top horizontal bulk material conveyor in position to receive bulk materials leaving a forward end of that top conveyor, said bottom conveyor being movable between an inboard position substantially entirely under the back bridge and an outboard position wherein the horizontal conveyor discharge point is adjacent the farthestmost outer end position of the outboard boom, and
  (3) means for moving the bottom horizontal conveyor between said outboard and said inboard positions; and
R. said chute means is fastened to the outboard end of said bottom horizontal conveyor to move with said conveyor so that the chute means lies in position to receive bulk materials discharged from the horizontal conveyor discharge point wherever it and said outboard end of said bottom conveyor are situated.

14. The bulk material unloader of claim 13 wherein:
S. the horizontal bulk material conveyor means includes two fixed top horizontal bulk material conveyors, one on each side of the back bridge and two bottom horizontal bulk material conveyors, one under each fixed top conveyor;
T. said elevating conveyor means is operative to convey bulk materials from the bulk material receiving means to each of the fixed top horizontal bulk material conveyors; and
U. the chute means includes a pair of hollow bulk conveyor legs each in alignment under the outboard end of one of the bottom horizontal conveyors, said chute conveyor legs converging into a vertical chute located below and in vertical alignment with the trolley track means.

* * * * *

UNITED STATES PATENT AND TRADEMARK OFFICE
CERTIFICATE OF CORRECTION

PATENT NO. : 4,568,232

DATED : February 4, 1986

INVENTOR(S) : Richard J. Juelich, Louis F. Ray

It is certified that error appears in the above-identified patent and that said Letters Patent is hereby corrected as shown below:

Claim 1, line 2, (column 15, line 60) "loader" should be --unloader--.
Claim 9, line (column 20, line 40), "horizonttal" should be --horizontal--.

Signed and Sealed this

Thirteenth Day of May 1986

[SEAL]

Attest:

DONALD J. QUIGG

Attesting Officer

Commissioner of Patents and Trademarks